US009151221B2

(12) United States Patent
Endo et al.

(10) Patent No.: US 9,151,221 B2
(45) Date of Patent: Oct. 6, 2015

(54) ELECTRIC VEHICLE

(75) Inventors: Yasuhiro Endo, Toyota (JP); Yukihiro Minezawa, Okazaki (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 12 days.

(21) Appl. No.: 13/491,313

(22) Filed: Jun. 7, 2012

(65) Prior Publication Data

US 2013/0006460 A1    Jan. 3, 2013

(30) Foreign Application Priority Data

Jun. 8, 2011    (JP) .................................. 2011-128180

(51) Int. Cl.
| | |
|---|---|
| *B60L 15/38* | (2006.01) |
| *B60L 11/00* | (2006.01) |
| *B60L 15/20* | (2006.01) |
| *B60K 6/365* | (2007.10) |
| *F02B 67/00* | (2006.01) |
| *B60H 1/00* | (2006.01) |
| *B60H 1/32* | (2006.01) |
| *F16H 37/08* | (2006.01) |

(52) U.S. Cl.
CPC ............ *F02B 67/00* (2013.01); *B60H 1/00392* (2013.01); *B60H 1/3208* (2013.01); *B60H 1/3222* (2013.01); *F16H 2037/0866* (2013.01); *Y02T 10/7258* (2013.01)

(58) Field of Classification Search
CPC ........ B60K 17/28; B60K 6/365; F02B 33/34; F16H 3/724; B60L 15/20; B60L 15/38; B60L 11/00; B60L 9/18; F04B 49/00; F04B 49/06; Y02T 10/70; Y02T 10/6221; Y10S 903/913
USPC ...................... 477/3; 475/5; 180/165; 62/133
See application file for complete search history.

(56) References Cited

U.S. PATENT DOCUMENTS

| | | | |
|---|---|---|---|
| 6,175,805 B1 * | 1/2001 | Abe ............................... 701/533 |
| 6,845,832 B2 * | 1/2005 | Takizawa et al. ............ 180/53.8 |
| 8,591,360 B2 * | 11/2013 | Kawasaki et al. ................. 475/5 |
| 2009/0176611 A1 | 7/2009 | Avery | |

FOREIGN PATENT DOCUMENTS

| | | | | |
|---|---|---|---|---|
| CN | 2009-92134 Y | | 12/2007 | |
| JP | 10339274 A | * | 12/1998 | .............. F04B 49/06 |
| JP | 2003139026 A | | 5/2003 | |
| JP | 2009173128 A | | 8/2009 | |
| JP | 2010-500205 A | | 1/2010 | |
| JP | 2010-500206 A | | 1/2010 | |
| JP | 2010-076678 A | | 4/2010 | |

(Continued)

*Primary Examiner* — John Q Nguyen
*Assistant Examiner* — Aaron Smith
(74) *Attorney, Agent, or Firm* — Gifford, Krass, Sprinkle, Anderson & Citkowski, P.C.

(57) ABSTRACT

An electric vehicle includes: a second drive motor that is coupled to drive wheels to rotationally drive the drive wheels; a compressor that activates an air conditioner; a first drive motor that can drive the compressor; a planetary gear device that includes a first rotary element to which the second drive motor is coupled, a second rotary element to which the compressor is coupled, and a third rotary element to which the first drive motor is coupled; and a brake that selectively couples the compressor to a non-rotary member when the brake is engaged.

6 Claims, 7 Drawing Sheets

(56) References Cited

FOREIGN PATENT DOCUMENTS

| JP | 2010-178403 A | 8/2010 |
| JP | 2010178403 | * 8/2010 |
| JP | 2010208411 A | 9/2010 |

* cited by examiner

ELECTRIC VEHICLE

INCORPORATION BY REFERENCE

The disclosure of Japanese Patent Application No. 2011-128180 filed on Jun. 8, 2011 including the specification, drawings and abstract is incorporated herein by reference in its entirety.

BACKGROUND OF THE INVENTION

1. Field of the Invention

The present invention relates to an electric vehicle that includes a vehicle drive motor that drives the vehicle and an air-conditioner drive motor that drives an air-conditioner compressor.

2. Description of Related Art

There is proposed a drive device for an electric vehicle in which a vehicle drive motor that rotationally drives drive wheels of the vehicle and an air-conditioner drive motor that rotationally drives an air-conditioner compressor are coupled to each other via a planetary gear mechanism so that the rotational force of the air-conditioner drive motor is also transferred to the vehicle drive motor to assist drive of the vehicle. Such an electric vehicle drive system is described in Japanese Patent Application Publication No. 2010-178403 (JP-2010-178403-A), for example.

The electric vehicle drive system allows the rotational force of the air-conditioner drive motor not only to be utilized to rotationally drive the air-conditioner compressor, but also to be transferred to the vehicle drive motor via the planetary gear mechanism to assist the vehicle drive motor. This reduces the number of motors from three to two, and reduces the size of the vehicle drive motor to suppress an increase in weight of the vehicle.

SUMMARY OF THE INVENTION

In the electric vehicle drive system according to JP-2010-178403-A, however, rotary elements of the planetary gear mechanism are coupled such that output of the vehicle drive motor is input to a ring gear of the planetary gear mechanism and output of the air-conditioner drive motor is input to a sun gear at the same time to be output from a carrier to the drive wheels. Thus, in order to rotationally drive the drive wheels, the vehicle drive motor and the air-conditioner drive motor are inevitably required to output a drive force at the same time, which may reduce the motor efficiency. In general, in the case where a single drive motor is used to generate a drive force for a vehicle, the drive motor is driven with a relatively high load in a regularly used normal travel range, which achieves a high motor efficiency. In the case where the vehicle is driven using two drive motors, however, the load is distributed to the two drive motors so that each of the drive motors is driven with a low load, which may reduce the motor efficiency. The reduced motor efficiency directly leads to a shortened travel distance of the electric vehicle for the same capacity of an electricity storage device, and to an increased size of the electricity storage device for the same travel distance.

The present invention provides an electric vehicle that achieves an enhanced motor efficiency in a normal travel range.

An aspect of the present invention is directed to an electric vehicle. The electric vehicle includes: a second drive motor that is coupled to drive wheels to rotationally drive the drive wheels; a compressor that activates an air conditioner; a first drive motor that can drive the compressor; a planetary gear device that includes a first rotary element to which the second drive motor is coupled, a second rotary element to which the compressor is coupled, and a third rotary element to which the first drive motor is coupled; and a brake that selectively couples the compressor to a non-rotary member when the brake is engaged.

According to the thus configured electric vehicle, when a large drive force is required, for example when the vehicle is starting on an ascending slope, starting abruptly, or accelerating while traveling, the drive wheels of the vehicle can be rotationally driven using both output of the first drive motor and output of the second drive motor by activating the first drive motor and the second drive motor with the brake stopping rotation of the air-conditioner compressor and rotation of the planetary gear device to which the air-conditioner compressor is coupled. Thus, high-acceleration travel can be achieved using the two motors, namely the first drive motor and the second drive motor. During normal-acceleration travel, which requires a low drive force compared to the high-acceleration travel, the drive wheels of the vehicle can be rotationally driven using only output of the second drive motor with the brake disengaged. Thus, normal-acceleration travel can be achieved using the single second drive motor. In this way, a high motor efficiency can be achieved using the single second drive motor during normal-acceleration travel which is regularly performed. This results in a longer travel distance of the electric vehicle for the same capacity of an electricity storage device, and in a reduced size of the electricity storage device for the same travel distance.

The electric vehicle may further include an electronic control device that switchably selects one of a start acceleration mode, a normal travel mode, and a vehicle stationary mode on the basis of output required for the electric vehicle, the start acceleration mode being configured such that the drive wheels are driven using output of the first drive motor and output of the second drive motor by driving the first drive motor and the second drive motor with the brake engaged in the start acceleration mode, the normal travel mode being configured such that the drive wheels are driven using output of the second drive motor with the brake disengaged in the normal travel mode, and the vehicle stationary mode being configured such that the compressor can be driven using output of the first drive motor with the brake disengaged in the vehicle stationary mode. With this configuration, one of the start acceleration mode, the normal travel mode, and the vehicle stationary mode is switchably selected by the electronic control device on the basis of the output required for the electric vehicle, when normal output is required, for example during normal-acceleration travel which is regularly performed, the normal travel mode is selected, and the vehicle travels using the single second drive motor to achieve a high motor efficiency. This results in a longer travel distance of the electric vehicle for the same capacity of an electricity storage device, and in a reduced size of the electricity storage device for the same travel distance. When a large drive force is required, for example when the vehicle is starting on an ascending slope, starting abruptly, or accelerating while traveling, the start acceleration mode is selected, and the vehicle travels using the two motors, namely the first drive motor and the second drive motor, to achieve high-acceleration travel. When no output is required, the vehicle stationary mode is selected. Thus, the air-conditioner compressor can be driven using output of the second drive motor, and the air conditioner can be activated as necessary.

In the electric vehicle, when the first drive motor and the second drive motor are driven in the start acceleration mode, the electronic control device may decide a proportion between output torque of the first drive motor and output torque of the second drive motor such that a total loss caused by the first drive motor and the second drive motor becomes minimum on the basis of information related to a loss in efficiency of the first drive motor and information related to a loss in efficiency of the second drive motor. With this configuration, the proportion between output torque of the first drive motor and output torque of the second drive motor is decided such that the total loss that is caused by both the motors becomes minimum when the first drive motor and the second drive motor are activated in the start acceleration mode. Thus, the fuel efficiency of the vehicle can be advantageously further improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention will be described in detail below with reference to the drawings.

Figure 1:
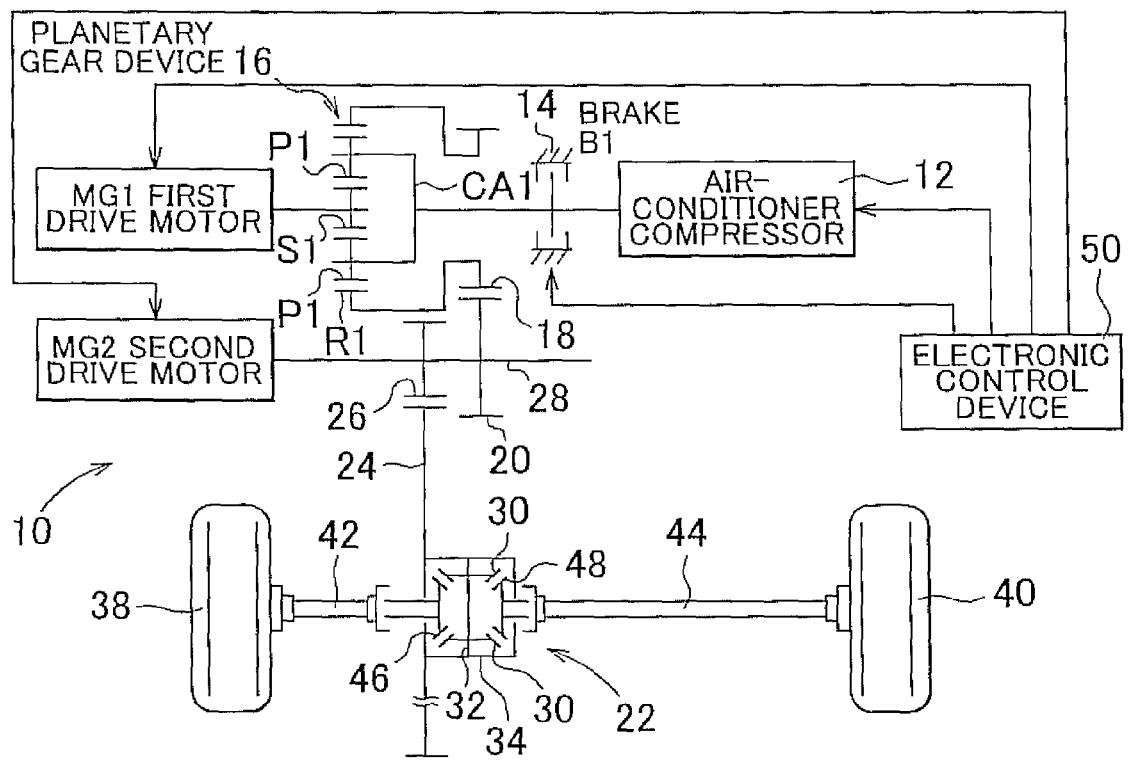
FIG. 1 is a skeleton diagram that illustrates a drive device for an electric vehicle according to a first embodiment of the present invention.

FIG. 1 is a skeleton diagram that illustrates a drive device 10 for an electric vehicle according to a first embodiment of the present invention. As shown in FIG. 1, the electric vehicle according to the embodiment includes an air-conditioner compressor 12 that activates an air conditioner, a first drive motor MG1 for the air conditioner that rotationally drives the air-conditioner compressor 12, and a second drive motor MG2 for vehicle drive that drives the vehicle. In the embodiment, the first drive motor MG1 and the second drive motor MG2 are formed by a motor generator that is capable of operating as an electric motor and an electric generator. However, at least the drive motor MG1 may be formed by a normal electric motor.

The drive device 10 includes a brake B1 that stops rotation of the air-conditioner compressor 12, and a planetary gear device 16 that includes three elements that are directly or indirectly coupled to the second drive motor MG2, the air-conditioner compressor 12, and the first drive motor MG1, respectively. More particularly, the planetary gear device 16 includes a sun gear S1, a carrier CA1, and a ring gear R1. The sun gear S1 is coupled to the first drive motor MG1. The carrier CA1 supports planetary gears P1 that mesh with the sun gear S1 such that each of the planetary gears P1 can rotate about its own axis and such that the planetary gears P1 can revolve about a common axis. The carrier CA1 is coupled to the air-conditioner compressor 12. A brake B1 selectively couples the carrier CA1 to a case 14 that is a non-rotary member to stop rotation of the carrier CA1. The ring gear R1 meshes with the planetary gears P1.

The second drive motor MG2 is directly coupled to a counter shaft 28. The counter shaft 28 includes a counter driven gear 20 that meshes with an output gear 18 that is provided on the ring gear R1, and a counter drive gear 26 that meshes with a large-diameter gear 24 of a final speed reducer 22 and that is smaller in diameter than the counter driven gear 20. The second drive motor MG2 is indirectly coupled to the ring gear R1 of the planetary gear device 16. The final speed reducer 22 includes the large-diameter gear 24, a differential case 34, and a pair of side gears 46 and 48. The large-diameter gear 24 is larger in diameter than the counter drive gear 26. The differential case 34 includes a pinion shaft 32 that extends in the radial direction and that rotatably supports pinions 30, and rotates together with the large-diameter gear 24. The side gears 46 and 48 are coupled to a pair of left and right drive wheels 38 and 40 via a pair of axles 42 and 44, respectively, and mesh with the pinions 30 from both sides in the differential case 34.

Figure 2:
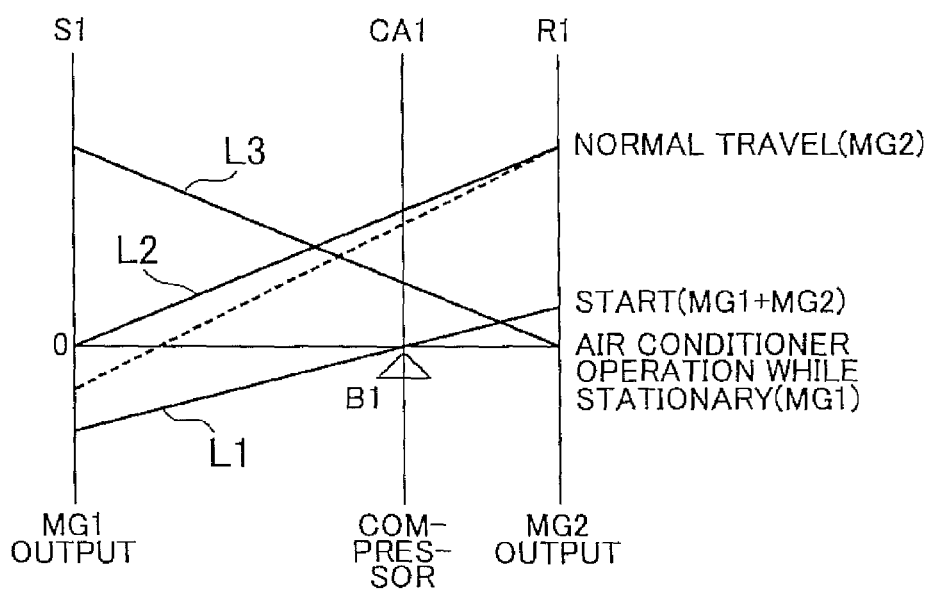
FIG. 2 is a collinear diagram that illustrates operation of a planetary gear device of the drive device of FIG. 1.

FIG. 2 is a collinear diagram that illustrates operation of the drive device 10 configured as described above. In the collinear diagram of FIG. 2, the left vertical axis which indicates the rotational speed of the sun gear S1 and the middle vertical axis which indicates the rotational speed of the carrier CA1 are disposed such that the interval between the axes corresponds to 1, and the middle vertical axis and the right vertical axis which indicates the rotational speed of the ring gear R1 are disposed relative to each other such that the interval between the axes corresponds to a gear ratio ρ of the planetary gear device 16 (=the number of teeth of the sun gear S1/the number of teeth of the ring gear R1). In the collinear diagram, the relative rotational speeds of the sun gear S1, the carrier CA1, and the ring gear R1 are indicated by the intersections of a line with the left vertical axis, the middle vertical axis, and the right vertical axis, respectively.

A description is made with reference to FIG. 2. When the electric vehicle is in a start acceleration travel mode, the brake B1 is engaged to stop rotation of the air-conditioner compressor 12 and rotation of the carrier CA1 which is coupled to the air-conditioner compressor 12, and both output of the first drive motor MG1 for the air conditioner and output of the second drive motor MG2 for vehicle drive which drives the vehicle are transferred to the pair of left and right drive wheels 38 and 40. The electric vehicle thus achieves high-acceleration travel during start on an ascending slope, acceleration for start, and acceleration while traveling using output of the first drive motor MG1 and output of the second drive motor MG2. A line L1 of FIG. 2 indicates this state.

When the electric vehicle is in a normal travel mode, which is regularly used and which requires a low drive force compared to the start acceleration travel mode, the brake B1 is disengaged and the first drive motor MG1 is deactivated so that only output of the second drive motor MG2 is transferred to the pair of left and right drive wheels 38 and 40. The electric vehicle thus travels using only output of the second drive motor MG2. A line L2 of FIG. 2 indicates this state. The first drive motor MG1 is rotated in a following manner, and thus operation of the first drive motor MG1 is unstable and may take a state that is indicated by the broken line, for example. In order to activate the air conditioner in response to an air-conditioner request, rotation of the first drive motor MG1 is increased to increase rotation of the air-conditioner compressor 12. At this time, the first drive motor MG1 can increase rotation of the air-conditioner compressor 12 through regeneration from negative rotation to zero rotation until the line L2 is reached. In addition, the first drive motor MG1 can further increase rotation of the air-conditioner compressor 12 through power running from zero rotation to positive rotation.

When the electric vehicle is in a vehicle stationary mode in which the vehicle is stationary, the brake B1 is disengaged, and the second drive motor MG2 is deactivated. At this time, rotation of the second drive motor MG2 is restrained by an electromagnetic brake, a wheel brake of the vehicle, or a parking brake (not shown). In order to activate the air conditioner in response to an air-conditioner request, rotation of the first drive motor MG1 is increased to increase rotation of the air-conditioner compressor 12. A line L3 of FIG. 2 indicates this state.

Figure 3:
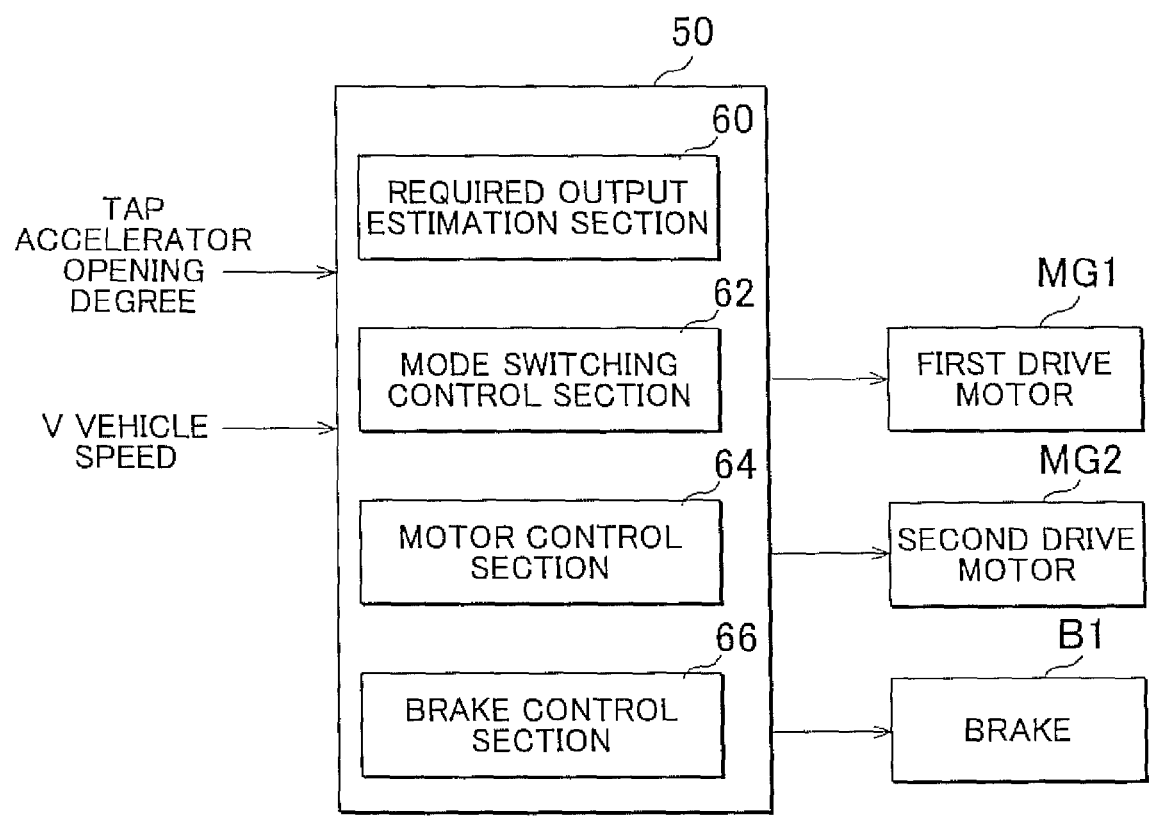
FIG. 3 is a functional block and line diagram that illustrates essential portions for control functions of an electronic control device provided in the electric vehicle of FIG. 1.

An electronic control device 50 provided in the electric vehicle of FIG. 1 includes a so-called microcomputer that includes a CPU, a RAM, a ROM, and an input/output interface. The CPU processes an input signal in accordance with a program that is stored in advance in the ROM or the RAM to control the first drive motor MG1, the second drive motor MG2, and the brake B1. FIG. 3 is a functional block and line diagram that illustrates essential portions for control functions of the electronic control device 50. In FIG. 3, a required output estimation section 60 calculates an amount P of output required for the vehicle on the basis of an accelerator opening degree TAP and a vehicle speed V using a relationship that is stored in advance. The accelerator opening degree TAP is the amount of operation of an accelerator pedal of the electric vehicle. A mode switching control section 62 selects one of the start acceleration travel mode, the normal travel mode, and the vehicle stationary mode on the basis of the actual required output amount P which is estimated by the required output estimation section 60 using the relationship that is stored in advance. For example, when the actual required output amount P which is estimated by the required output estimation section 60 is equal to or more than a start acceleration travel mode determination value that is set in advance, the mode switching control section 62 selects the start acceleration travel mode for the vehicle. When the actual required output amount P falls below the start acceleration travel mode determination value and the vehicle is traveling, the mode switching control section 62 selects the normal travel mode for the vehicle. When the actual required output amount P falls below the start acceleration travel mode determination value and the vehicle is stationary, the mode switching control section 62 selects the vehicle stationary mode.

When the mode switching control section 62 selects the start acceleration travel mode, a motor control section 64 and a brake control section 66 engage the brake B1 to stop rotation of the air-conditioner compressor 12 and the carrier CA1 which is coupled to the air-conditioner compressor 12. In addition, the motor control section 64 and the brake control section 66 control output of the first drive motor MG1 and output of the second drive motor MG2 so as to achieve the amount P of output required for the vehicle which is calculated by the required output estimation section 60.

When the mode switching control section 62 selects the normal travel mode, the motor control section 64 and the brake control section 66 disengage the brake B1 and deactivate the first drive motor MG1 so as to achieve the amount P of output required for the vehicle which is calculated by the required output estimation section 60 by controlling only output of the second drive motor MG2. In addition, the motor control section 64 and the brake control section 66 increase rotation of the air-conditioner compressor 12 by controlling rotation of the first drive motor MG1 in the case where operation of the air conditioner is requested. When the mode switching control section 62 selects the vehicle stationary mode, the motor control section 64 and the brake control section 66 disengage the brake B1 and deactivate the second drive motor MG2. In addition, the motor control section 64 and the brake control section 66 increase rotation of the air-conditioner compressor 12 by increasing rotation of the first drive motor MG1 in the case where operation of the air conditioner is requested.

When the mode switching control section 62 selects the start acceleration travel mode in which output of the first drive motor MG1 and output of the second drive motor MG2 are controlled, the motor control section 64 decides the proportion between output of the first drive motor MG1 and output of the second drive motor MG2 such that the total of a loss that is caused by the first drive motor MG1 and a loss caused by the second drive motor MG2 becomes minimum, and causes the first drive motor MG1 and the second drive motor MG2 to output a drive force in accordance with the decided proportion.

Figure 4:
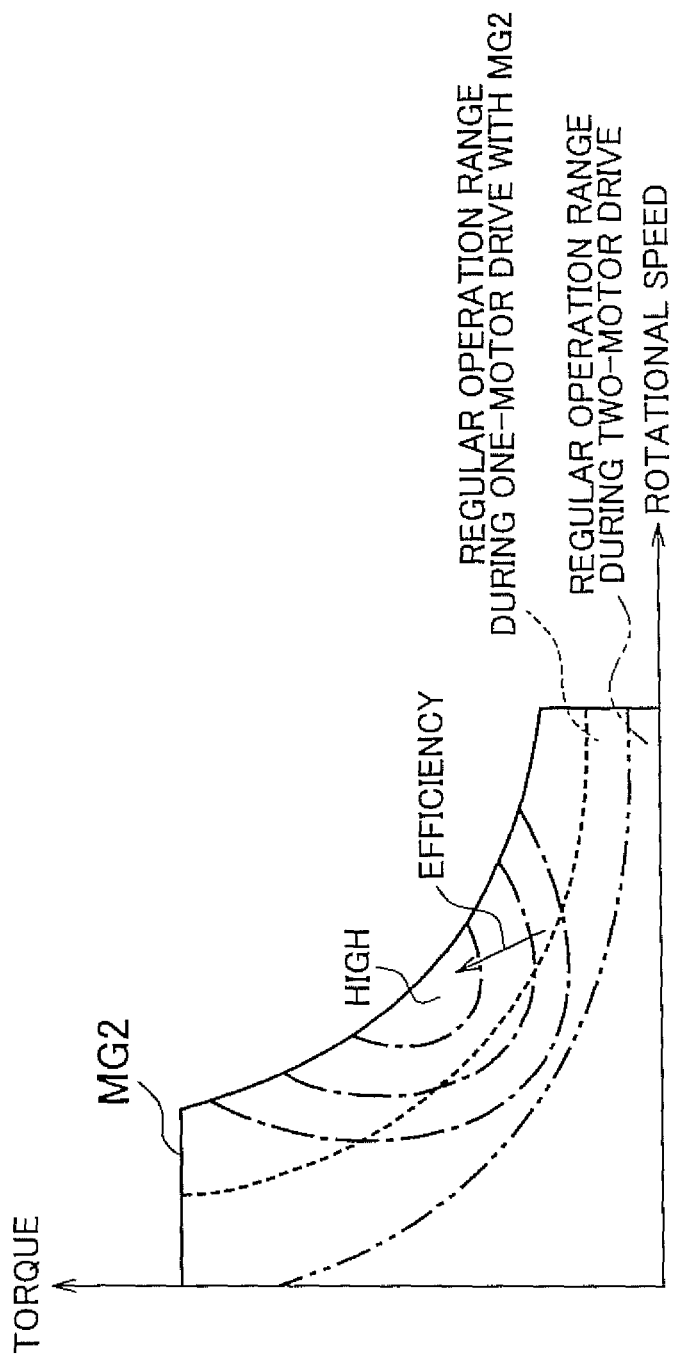
FIG. 4 illustrates a regular operation range in a normal travel mode in which the vehicle is driven by a single second drive motor under control by a motor control section of FIG. 3 in contrast to a regular operation range of the second drive motor in a travel mode in which the vehicle is driven by two motors.

FIG. 4 illustrates a regular operation range in the normal travel mode in which the vehicle is driven by only output of the second drive motor MG2 in comparison to a case where the vehicle is driven by output of the first drive motor MG1 and output of the second drive motor MG2. In FIG. 4, the motor efficiency of the second drive motor MG2 is indicated by the single-dashed lines in the manner of contour lines, in the operable range of the second drive motor MG2 which is indicated by the solid line. The regular operation range of the second drive motor MG2 in the normal travel mode in which the vehicle is driven by the single second drive motor MG2 is indicated by the broken line. Thus, the second drive motor MG2 is driven in a range in which the motor efficiency of the second drive motor MG2 is relatively high. In the case where the vehicle is driven using output of the first drive motor MG1 and output of the second drive motor MG2, in contrast, output of the second drive motor MG2 has been reduced by an amount corresponding to the assistance provided by the first drive motor MG1. The regular operation range of the second drive motor MG2 becomes lower as indicated by the double-dashed line. Thus, the second drive motor MG2 is driven in a range in which the motor efficiency of the second drive motor MG2 is lower. Output of the first drive motor MG1 has also been reduced by an amount corresponding to the output of the second drive motor MG2. Thus, the first drive motor MG1 is likewise driven in a range in which the motor efficiency of the first drive motor MG1 is lower.

Figure 5:
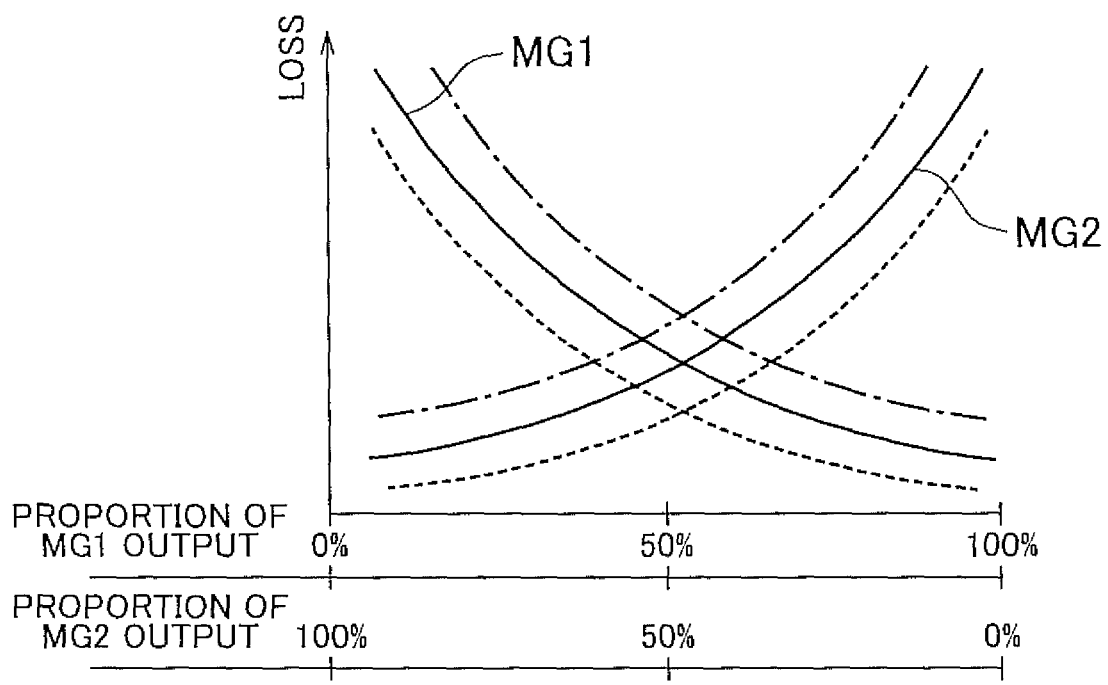
FIG. 5 illustrates operation in which the output proportion in a start acceleration mode in which the vehicle is driven by a first drive motor and the second drive motor under control by the motor control section of FIG. 3 is decided on the basis of loss curves.

FIG. 5 illustrates the proportion between output of the first drive motor MG1 and output of the second drive motor MG2 which is decided by the motor control section 64 in the start acceleration travel mode. In FIG. 5, the horizontal axis represents the proportion between output of the first drive motor MG1 and output of the second drive motor MG2, and the vertical axis represents the losses that are caused by the first drive motor MG1 and the second drive motor MG2. FIG. 5 shows loss curves for the first drive motor MG1 and output and the second drive motor MG2 at a predetermined rotational speed, which are similar to quadric curves. The loss curves indicate that the loss becomes lower as the output proportion becomes closer to 100% (rated output). In addition, the losses that are caused by the first drive motor MG1 and the second drive motor MG2 tend to become higher as temperatures T1 and T2 of the motors become higher, respectively. Thus, the loss curves for the first drive motor MG1 and the second drive motor MG2 are shifted in accordance with the motor temperatures T1 and T2, respectively, as indicated by the single-dashed lines and the broken lines of FIG. 5. Further, the losses that are caused by the first drive motor MG1 and the second drive motor MG2 tend to become higher as rotational speeds N1 and N2 of the motors become higher, respectively. Thus, the loss curves for the first drive motor MG1 and the second drive motor MG2 are shifted in accordance with the motor speeds N1 and N2, respectively, as indicated by the single-dashed lines and the broken lines of FIG. 5. The motor control section 64 decides in advance the loss curves for the first drive motor MG1 and the second drive motor MG2 in accordance with the motor temperature T (T1 and T2) and the motor speed N (N1 and N2), respectively, and decides the proportion (%) between output of the first drive motor MG1 and output of the second drive motor MG2 at which the total loss that is caused by the first drive motor MG1 and the second drive motor MG2 becomes minimum on the basis of the decided loss curves for the first drive motor MG1 and the second drive motor MG2 to control operation of the first drive motor MG1 and operation of the second drive motor MG2 so as to maintain the decided output proportion. The motor temperatures and the motor speeds may be included in "information that is related to a loss in efficiency of the motor".

Figure 6:
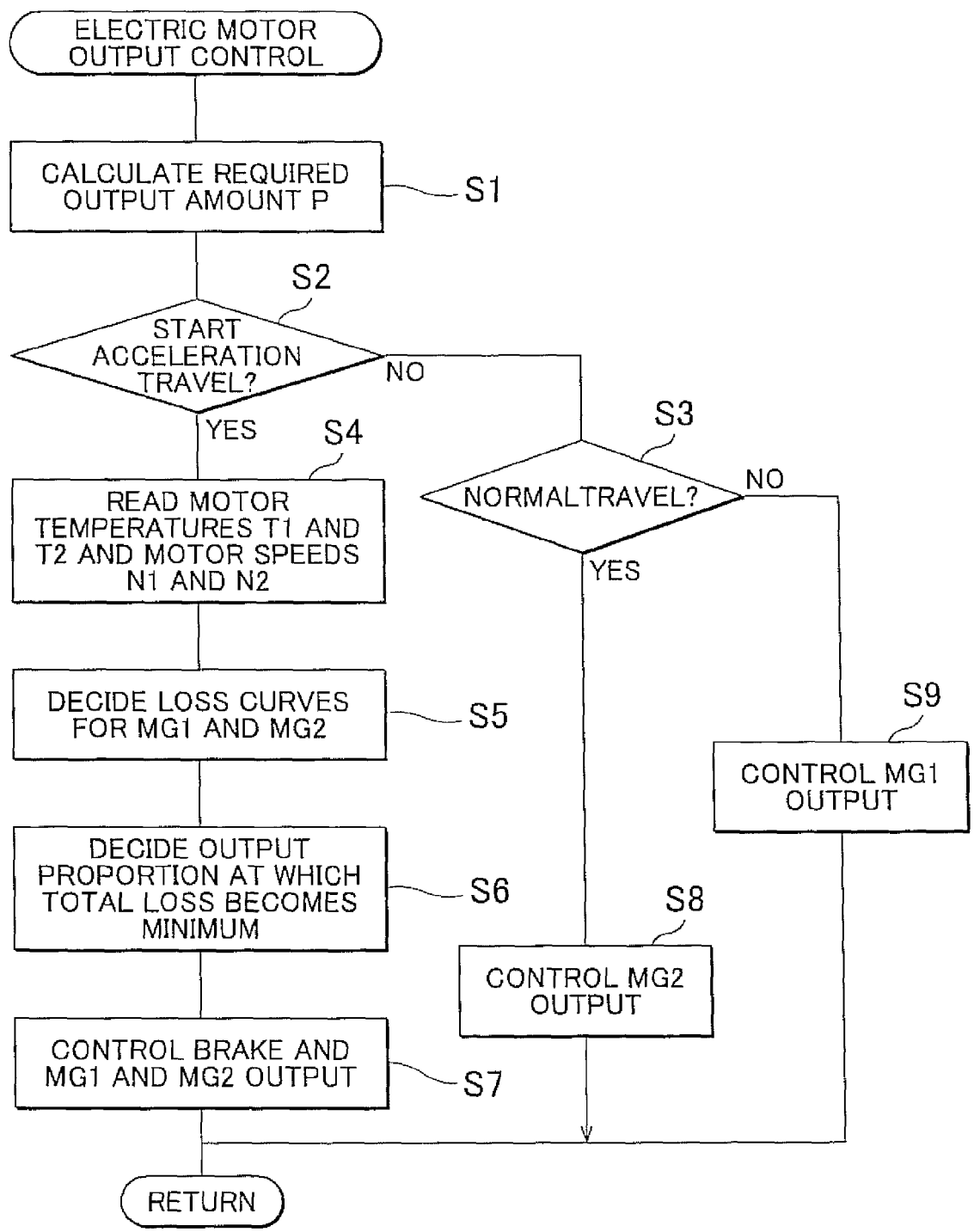
FIG. 6 is a flowchart that illustrates essential portions for control operation of the electronic control device provided in the electric vehicle of FIG. 1.

FIG. 6 is a flowchart that illustrates essential portions for control operation of the electronic control device 50 of FIG. 1. In FIG. 6, in step S1 (hereinafter the term "step" is omitted) which corresponds to the required output estimation section 60, the actual amount P of output required for the vehicle is calculated on the basis of the accelerator opening degree TAP, which is the amount of operation of the accelerator pedal of the electric vehicle, and the vehicle speed V using the relationship that is stored in advance. Then, in S2 and S3 which correspond to the mode switching control section 62, one of the start acceleration travel mode, the normal travel mode, and the vehicle stationary mode is selected on the basis of the actual required output amount P which is calculated using the relationship that is stored in advance. For example, when the actual required output amount P is equal to or more than the start acceleration travel mode determination value that is set in advance, the result of determination in S2 as to whether or not the vehicle is in the start acceleration travel mode is positive. When the actual required output amount P falls below the start acceleration travel mode determination value and the vehicle is traveling, the result of determination in S3 as to whether or not the vehicle is in the normal travel mode is positive. When the actual required output amount P falls below the start acceleration travel mode determination value and the vehicle is stationary, the result of determination in S3 is negative, and the vehicle stationary mode is selected.

When the result of determination in S2 is positive, the start acceleration travel mode is selected. Thus, in S4, the motor temperatures T1 and T2 and the motor speeds N1 and N2 of the first drive motor MG1 and the second drive motor MG2 are read. In S5, the loss curves for the first drive motor MG1 and the second drive motor MG2 are decided on the basis of the motor temperatures T1 and T2 and the motor speeds N1 and N2 of the first drive motor MG1 and the second drive motor MG2, respectively. In S6, as shown in FIG. 5, the proportion between output of the first drive motor MG1 and output of the second drive motor MG2 at which the total loss that is caused by the first drive motor MG1 and the second drive motor MG2 becomes minimum is decided. Normally, the proportion between output of the first drive motor MG1 and output of the second drive motor MG2 that corresponds to the intersection between the loss curve for the first drive motor MG1 and the loss curve for the second drive motor MG2 is decided as the minimum total loss point. Then, in S7 which corresponds to the motor control section 64 and the brake control section 66, drive control is performed such that the total of output of the first drive motor MG1 and output of the second drive motor MG2 matches the amount P of output required for the vehicle and such that the proportion between output of the first drive motor MG1 and output of the second drive motor MG2 matches the output proportion decided in S6. At the same time, the brake B1 is engaged.

When the result of determination in S2 is negative and the result of determination in S3 is positive, the normal travel mode is selected. Thus, in S8 which corresponds to the motor control section 64 and the brake control section 66, the brake B1 is disengaged and the first drive motor MG1 is deactivated, and only output of the second drive motor MG2 is controlled so as to achieve the amount P of output required for the vehicle. In the case where operation of the air conditioner is requested in S8, rotation of the first drive motor MG1 is controlled so as to increase rotation of the air-conditioner compressor 12.

When the result of determination in S3 is negative, the vehicle stationary mode is selected. Thus, in step S9 which corresponds to the motor control section 64 and the brake control section 66, the brake B1 is disengaged and the second drive motor MG2 is deactivated. In the case where operation of the air conditioner is requested, rotation of the first drive motor MG1 is increased so as to increase rotation of the air-conditioner compressor 12.

With the drive device 10 for an electric vehicle according to the embodiment, as has been discussed above, when the start acceleration mode in which a large drive force is required is selected, for example when the vehicle is starting on an ascending slope, starting abruptly, or accelerating while traveling, the drive wheels 38 and 40 of the vehicle can be rotationally driven using both output of the first drive motor MG1 and output of the second drive motor MG2 by activating the first drive motor MG1 and the second drive motor MG2 with the brake B1 stopping rotation of the air-conditioner compressor 12 and rotation of the planetary gear device 16 to which the air-conditioner compressor 12 is coupled. Thus, high-acceleration travel can be achieved using the two motors, namely the first drive motor MG1 and the second drive motor MG2. In the normal travel mode, which requires a low drive force compared to the high-acceleration travel, the drive wheels 38 and 40 of the vehicle can be rotationally driven using only output of the second drive motor MG2 with the brake B1 disengaged. Thus, normal-acceleration travel can be achieved using the single second drive motor MG2. In this way, a high motor efficiency can be achieved using the single second drive motor MG2 during normal-acceleration travel which is regularly performed. This results in a longer travel distance of the electric vehicle for the same capacity of an electricity storage device, and in a reduced size of the electricity storage device for the same travel distance.

The drive device 10 for an electric vehicle according to the embodiment includes the electronic control device 50 which switchably selects one of the start acceleration mode, the normal travel mode, and the vehicle stationary mode on the basis of the output required for the vehicle. In the start acceleration mode, the drive wheels 38 and 40 of the vehicle are driven using output of the first drive motor MG1 and output of the second drive motor MG2 by driving the first drive motor MG1 and the second drive motor MG2 with the brake B1 engaged. In the normal travel mode, the drive wheels 38 and 40 of the vehicle are driven using only output of the second drive motor MG2 with the brake B1 disengaged. In the vehicle stationary mode, the air-conditioner compressor 12 can be driven using output of the first drive motor MG1 with the brake B1 disengaged. In this way, one of the start acceleration mode, the normal travel mode, and the vehicle stationary mode is switchably selected by the electronic control device 50 on the basis of the output required for the electric vehicle. Thus, when normal output is required, for example during normal-acceleration travel which is regularly performed, the normal travel mode is selected. Thus, the vehicle travels using the single second drive motor MG2 to achieve a high motor efficiency. This results in a longer travel distance of the electric vehicle for the same capacity of an electricity storage device, and in a reduced size of the electricity storage device for the same travel distance. When a large drive force is required, for example when the vehicle is starting on an ascending slope, starting abruptly, or accelerating while traveling, the start acceleration mode is selected. Thus, the vehicle travels using the two motors, namely the first drive motor MG1 and the second drive motor MG2, to achieve high-acceleration travel. When no output is required, the vehicle stationary mode is selected. Thus, the air-conditioner compressor 12 can be driven using output of the first drive motor MG1, and the air conditioner can be activated as necessary.

In the drive device 10 for an electric vehicle according to the embodiment, when the first drive motor MG1 and the second drive motor MG2 are driven in the start acceleration mode, the electronic control device 50 decides the proportion between output torque of the first drive motor MG1 and output torque of the second drive motor MG2 such that the total loss that is caused by the first drive motor MG1 and the second drive motor MG2 becomes minimum using the relationship that is stored in advance. With this configuration, the proportion between output torque of the first drive motor MG1 and output torque of the second drive motor MG2 is decided such that the total loss that is caused by both the motors becomes minimum when the first drive motor MG1 and the second drive motor MG2 are activated in the start acceleration mode. Thus, the fuel efficiency of the vehicle can be advantageously further improved.

Figure 7:
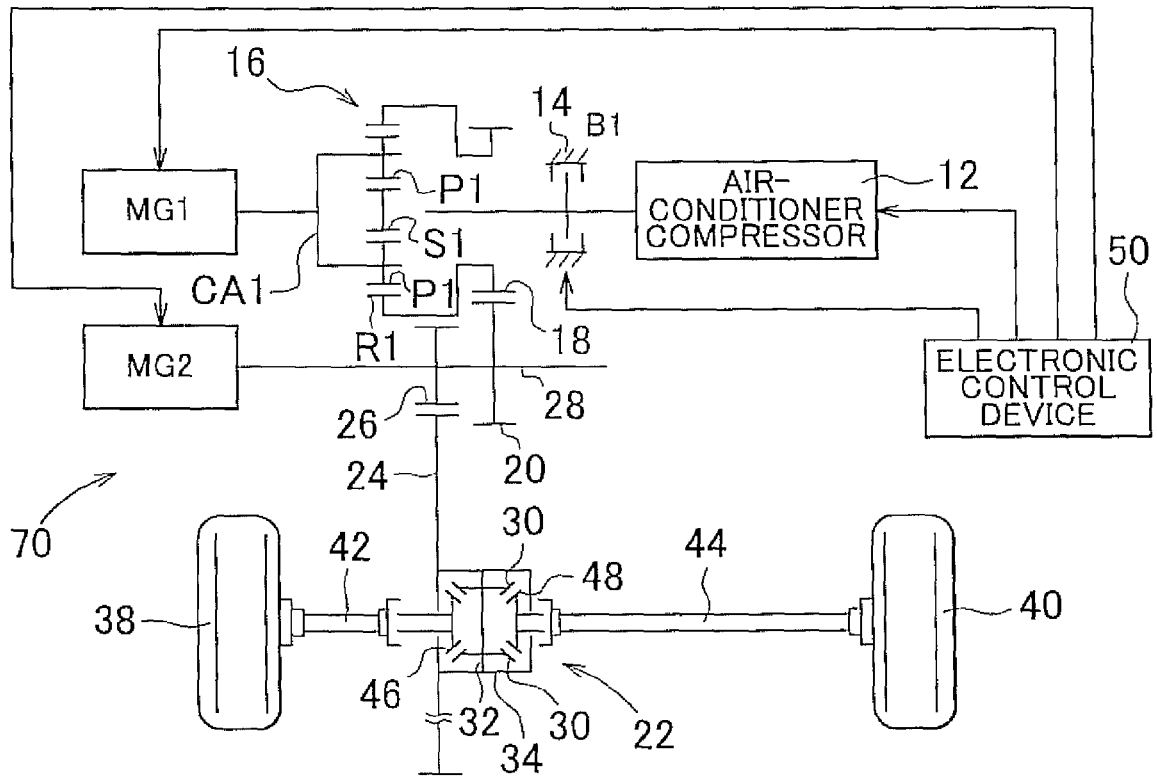
FIG. 7 is a skeleton diagram that illustrates a drive device for an electric vehicle according to a second embodiment of the present invention.

FIG. 7 is a skeleton diagram that illustrates a drive device 70 for an electric vehicle according to a second embodiment of the present invention. In the drive device 70 according to the embodiment, the sun gear S1 of the planetary gear device 16 is coupled to the air-conditioner compressor 12 and selectively coupled via the brake B1 to the case 14 which is a non-rotary member, the carrier CA1 of the planetary gear device 16 is coupled to the first drive motor MG1, and the ring gear R1 of the planetary gear device 16 is indirectly coupled to the second drive motor MG2 via the counter shaft 28. That is, the second embodiment is different from the first embodiment which is discussed earlier in connection between the first drive motor MG1, the second drive motor MG2, and the air-conditioner compressor 12 and the three rotary elements of the planetary gear device 16. In the first embodiment which is discussed earlier, the air-conditioner compressor 12 is coupled to the carrier CA1, and the first drive motor MG1 is coupled to the sun gear S1. In the second embodiment, conversely, the air-conditioner compressor 12 is coupled to the sun gear S1, and the first drive motor MG1 is coupled to the carrier CA1. The second embodiment is otherwise the same as the first embodiment. The same components are denoted by the same reference numerals so that the same description will not be repeated.

Figure 8:
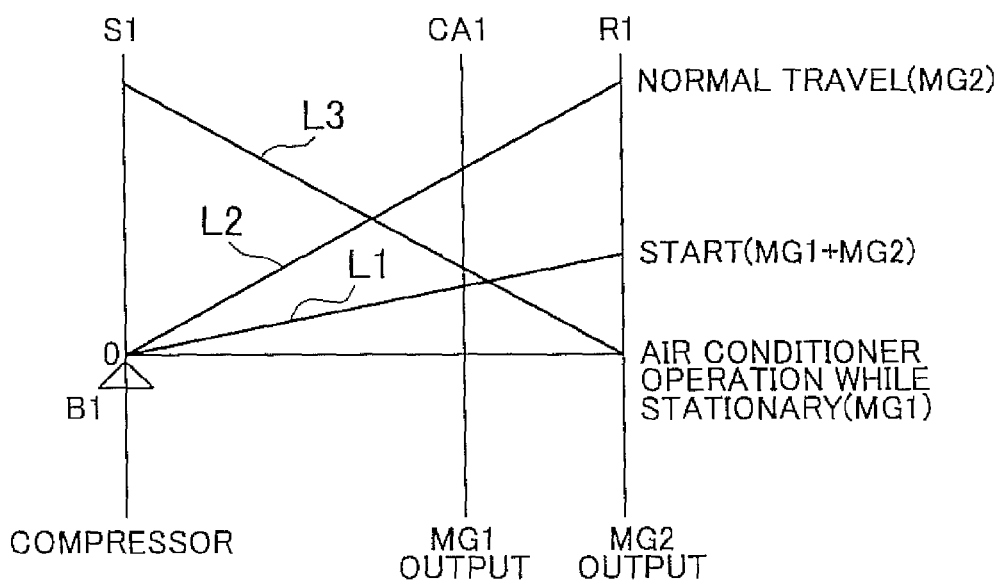
FIG. 8 is a collinear diagram that illustrates operation of a planetary gear device of the drive device according to the embodiment of FIG. 7.

FIG. 8 is a collinear diagram that illustrates operation of the planetary gear device 16 provided in the drive device 70 for an electric vehicle according to the embodiment. In FIG. 8, when the electric vehicle is in the start acceleration travel mode which is indicated by the line L1, the brake B1 is engaged to stop rotation of the air-conditioner compressor 12 and rotation of the sun gear S1 which is coupled to the air-conditioner compressor 12, and both output of the first drive motor MG1 for the air conditioner and output of the second drive motor MG2 for vehicle drive which drives the vehicle are transferred to the pair of left and right drive wheels 38 and 40. The electric vehicle thus achieves high-acceleration travel during start on an ascending slope, acceleration for start, and acceleration while traveling using output of the first drive motor MG1 and output of the second drive motor MG2.

The line L2 of FIG. 8 indicates the normal travel mode for the electric vehicle, which is regularly used and which requires a low drive force compared to the start acceleration travel mode. In the normal travel mode, the brake B1 is disengaged and the first drive motor MG1 is deactivated so that only output of the second drive motor MG2 is transferred to the pair of left and right drive wheels 38 and 40. The electric vehicle thus travels using only output of the second drive motor MG2. The first drive motor MG1 is rotated in a following manner, and rotation of the air-conditioner compressor 12 is generally stopped. In order to activate the air conditioner in response to an air-conditioner request, rotation of the first drive motor MG1 is increased to increase rotation of the air-conditioner compressor 12.

The line L3 of FIG. 8 indicates the vehicle stationary mode for the electric vehicle, in which the vehicle is stationary. The brake B1 is disengaged, and the second drive motor MG2 is deactivated. At this time, rotation of the second drive motor MG2 is restrained by an electromagnetic brake, a wheel brake of the vehicle, or a parking brake (not shown). In order to activate the air conditioner in response to an air-conditioner request, rotation of the first drive motor MG1 is increased to increase rotation of the air-conditioner compressor 12. Also in the drive device 70 according to the embodiment, the mode switching control section 62 switchably selects one of the start acceleration travel mode for the electric vehicle which is indicated by the line L1, the normal travel mode which is regularly used and which is indicated by the line L2, and the vehicle stationary mode which is indicated by the line L3, and the motor control section 64 and the brake control section 66 control the first electric motor MG1, the second electric motor MG2, and the brake B1. Thus, the same effect as that of the embodiment which is discussed earlier can be achieved.

Figure 9:
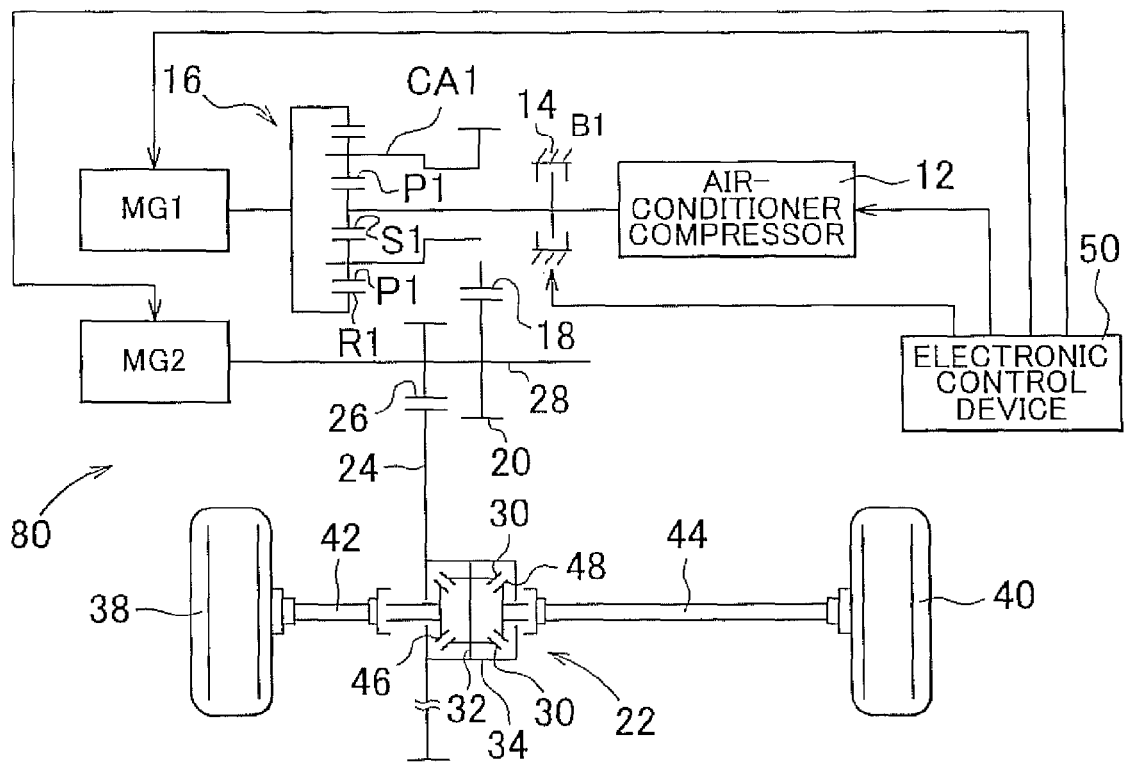
FIG. 9 is a skeleton diagram that illustrates a drive device for an electric vehicle according to a third embodiment of the present invention.

FIG. 9 is a skeleton diagram that illustrates a drive device 80 for an electric vehicle according to a third embodiment of the present invention. In the drive device 80 according to the embodiment, the sun gear S1 of the planetary gear device 16 is coupled to the air-conditioner compressor 12 and selectively coupled via the brake B1 to the case 14 which is a non-rotary member, the ring gear R1 of the planetary gear device 16 is coupled to the first drive motor MG1, and the carrier CA1 of the planetary gear device 16 is indirectly coupled to the second drive motor MG2 via the counter shaft 28. That is, the third embodiment is different from the second embodiment which is discussed earlier in connection between the first drive motor MG1, the second drive motor MG2, and the air-conditioner compressor 12 and the three rotary elements of the planetary gear device 16. In the second embodiment which is discussed earlier, the first drive motor MG1 is coupled to the carrier CA1, and the second drive motor MG2 is coupled to the ring gear R1. In the third embodiment, conversely, the first drive motor MG1 is coupled to the ring gear R1, and the second drive motor MG2 is coupled to the carrier CA1. The third embodiment is otherwise the same as the second embodiment. The same components are denoted by the same reference numerals so that the same description will not be repeated.

Figure 10:
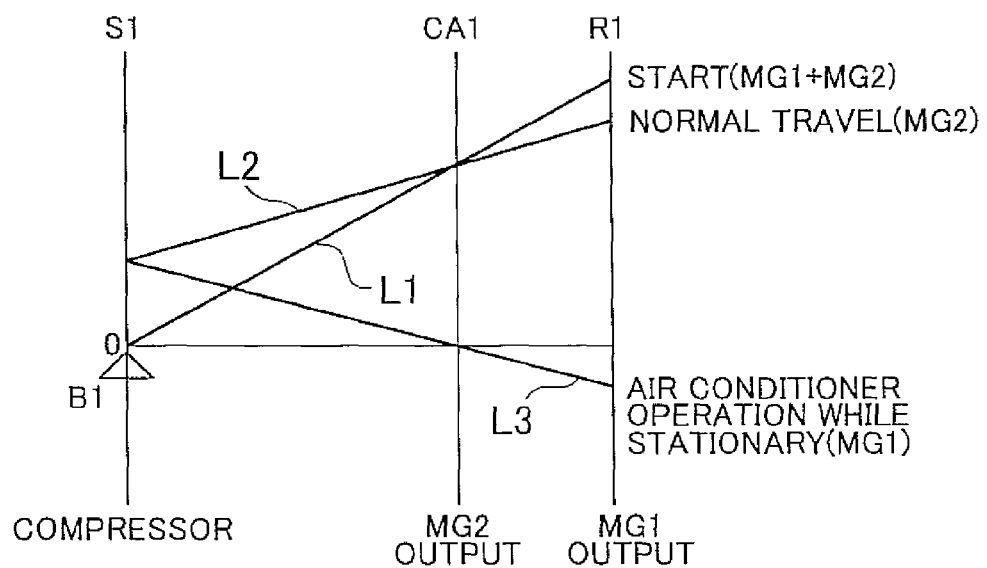
FIG. 10 is a collinear diagram that illustrates operation of a planetary gear device of the drive device according to the embodiment of FIG. 9.

FIG. 10 is a collinear diagram that illustrates operation of the planetary gear device 16 provided in the drive device 80 for an electric vehicle according to the embodiment. In FIG. 10, when the electric vehicle is in the start acceleration travel mode which is indicated by the line L1, the brake B1 is engaged to stop rotation of the air-conditioner compressor 12 and rotation of the sun gear S1 which is coupled to the air-conditioner compressor 12, and both output of the first drive motor MG1 for the air conditioner and output of the second drive motor MG2 for vehicle drive which drives the vehicle are transferred to the pair of left and right drive wheels 38 and 40. The electric vehicle thus achieves high-acceleration travel during start on an ascending slope, acceleration for start, and acceleration while traveling using output of the first drive motor MG1 and output of the second drive motor MG2.

The line L2 of FIG. 10 indicates the normal travel mode for the electric vehicle, which is regularly used and which requires a low drive force compared to the start acceleration travel mode. In the normal travel mode, the brake B1 is disengaged and the first drive motor MG1 is deactivated so that only output of the second drive motor MG2 is transferred to the pair of left and right drive wheels 38 and 40. The electric vehicle thus travels using only output of the second drive motor MG2. The first drive motor MG1 is rotated in a following manner, and rotation of the air-conditioner compressor 12 is substantially stopped. In order to activate the air conditioner in response to an air-conditioner request, rotation of the first drive motor MG1 is increased to increase rotation of the air-conditioner compressor 12.

The line L3 of FIG. 10 indicates the vehicle stationary mode for the electric vehicle, in which the vehicle is stationary. The brake B1 is disengaged, and the second drive motor MG2 is deactivated. At this time, rotation of the second drive motor MG2 is restrained by an electromagnetic brake, a wheel brake of the vehicle, or a parking brake (not shown). In order to activate the air conditioner in response to an air-conditioner request, rotation of the first drive motor MG1 is increased to increase rotation of the air-conditioner compressor 12. Also in the drive device 70 according to the embodiment, the mode switching control section 62 switchably selects one of the start acceleration travel mode for the electric vehicle which is indicated by the line L1, the normal travel mode which is regularly used and which is indicated by the line L2, and the vehicle stationary mode which is indicated by the line L3, and the motor control section 64 and the brake control section 66 control the first drive motor MG1, the second drive motor MG2, and the brake B1. Thus, the same effect as that of the embodiment which is discussed earlier can be achieved.

Embodiments of the present invention have been described in detail above with reference to the drawings. It should be noted, however, that the present invention may also be implemented in other embodiments.

For example, in the embodiments which are discussed earlier, the planetary gear device 16 is formed by one set of single-pinion planetary gear mechanism. However, the planetary gear device 16 may be a double-pinion planetary gear mechanism or a plurality of sets of planetary gear mechanisms.

In the electric vehicles according to the embodiments which are discussed earlier, the first drive motor MG1 and the second drive motor MG2 which serve as a drive source are disposed on the left side with respect to the planetary gear device 16, and the air-conditioner compressor 12 is disposed on the right side with respect to the planetary gear device 16. However, the arrangement of the first drive motor MG1, the second drive motor MG2, and the air-conditioner compressor 12 may be changed appropriately.

It should be noted that the embodiments which are discussed above are merely illustrative, and the present invention may be implemented in variously modified or improved forms on the basis of the knowledge of those skilled in the art.

What is claimed is:

1. An electric vehicle comprising:
a planetary gear device that includes a first rotary element, a second rotary element, and a third rotary element, the first rotary element is coupled to the third rotary element, the second rotary element is coupled to the third rotary element;
a compressor that is coupled to the second rotary element, the compressor activates an air conditioner;
an output shaft that is coupled to drive wheels, the first rotary element coupled to the output shaft;
a first drive motor generator that is coupled to the third rotary element, the first drive motor generator can drive the compressor through rotation of the second rotary element and the third rotary element, the first drive motor generator can drive the drive wheels through rotation of the third rotary element that drives the first rotary element which drives the output shaft;
a second drive motor generator that is directly coupled to the output shaft, the second drive motor generator can rotationally drive the drive wheels through rotation of the output shaft; and
a brake that selectively engages and disengages the compressor to a non-rotary member, in the engaged positon the brake stops rotation of the compressor and stops rotation of the second rotary element,
wherein the electric vehicle travels using the second drive motor generator and the first drive motor generator when the brake is engaged, and wherein the electric vehicle travels using only the second drive motor generator when the brake is disengaged.

2. The electric vehicle according to claim 1, further comprising:
an electronic control device that switchably selects one of a start acceleration mode, a normal travel mode, and a vehicle stationary mode on the basis of output required for the electric vehicle, the start acceleration mode being configured such that the drive wheels are driven using output of the first drive motor generator and output of the second drive motor generator by driving the first drive motor generator and the second drive motor generator with the brake engaged in the start acceleration mode, the normal travel mode being configured such that the drive wheels are driven using output of the second drive motor generator with the brake disengaged in the normal travel mode, and the vehicle stationary mode being configured such that the compressor can be driven using output of the first drive motor generator with the brake disengaged in the vehicle stationary mode.

3. The electric vehicle according to claim 2, wherein when the first drive motor generator and the second drive motor generator are driven in the start acceleration mode, the electronic control device decides a proportion between output torque of the first drive motor generator and output torque of the second drive motor generator such that a total loss caused by the first drive motor generator and the second drive motor generator becomes minimum on the basis of information related to a loss in efficiency of the first drive motor generator and information related to a loss in efficiency of the second drive motor generator.

4. The electric vehicle according to claim 1, wherein the first rotary element, the second rotary element, and the third rotary element of the planetary gear device are composed of a sun gear, a ring gear, and a carrier gear.

5. An electric vehicle comprising:
a planetary gear device that includes a ring gear, a carrier gear, and a sun gear, the ring gear is coupled to the sun gear, the carrier gear is coupled to the sun gear;
a compressor that is coupled to the carrier gear, the compressor activates an air conditioner;
an output shaft that is coupled to drive wheels, the ring gear coupled to the output shaft;
a first drive motor generator that is coupled to the sun gear, the first drive motor generator can drive the compressor through rotation of the carrier gear and the sun gear, the first drive motor generator can drive the drive wheels through rotation of the sun gear that drives the ring gear which drives the output shaft;
a second drive motor generator that is directly coupled to the output shaft, the second drive motor generator can rotationally drive the drive wheels through rotation of the output shaft; and
a brake that selectively engages and disengages the compressor to a non-rotary member, in the engaged positon the brake stops rotation of the compressor and stops rotation of the carrier gear,
wherein the electric vehicle travels using the second drive motor generator and the first drive motor generator when the brake is engaged, and wherein the electric vehicle travels using only the second drive motor generator when the brake is disengaged.

6. An electric vehicle comprising:
a planetary gear device that includes a ring gear, a sun gear, and a carrier gear, the ring gear is coupled to the carrier gear, the sun gear is coupled to the carrier gear;
a compressor that is coupled to the sun gear, the compressor activates an air conditioner;
an output shaft that is coupled to drive wheels, the ring gear coupled to the output shaft;
a first drive motor generator that is coupled to the carrier gear, the first drive motor generator can drive the compressor through rotation of the sun gear and the carrier gear, the first drive motor generator can drive the drive wheels through rotation of the carrier gear that drives the ring gear which drives the output shaft;
a second drive motor generator that is directly coupled to the output shaft, the second drive motor generator can rotationally drive the drive wheels through rotation of the output shaft; and
a brake that selectively engages and disengages the compressor to a non-rotary member, in the engaged positon the brake stops rotation of the compressor and stops rotation of the sun gear,
wherein the electric vehicle travels using the second drive motor generator and the first drive motor generator when the brake is engaged, and wherein the electric vehicle travels using only the second drive motor generator when the brake is disengaged.

* * * * *